United States Patent
Bellows et al.

[11] Patent Number: 5,955,214
[45] Date of Patent: *Sep. 21, 1999

[54] CARBON MONOXIDE REMOVAL METHOD BASED ON A REGENERABLE CO SCAVENGER

[75] Inventors: Richard James Bellows, Hampton; John Lawrence Robbins, Stockton, both of N.J.

[73] Assignee: Exxon Research and Engineering Co, Florham Park, N.J.

[ * ] Notice: This patent is subject to a terminal disclaimer.

[21] Appl. No.: 08/898,996

[22] Filed: Jul. 24, 1997

[51] Int. Cl.⁶ .................................................. H01M 8/18
[52] U.S. Cl. ................................ 429/17; 429/19
[58] Field of Search ................ 95/140; 429/17, 429/19

[56] References Cited

U.S. PATENT DOCUMENTS

| | | | |
|---|---|---|---|
| 3,699,218 | 10/1972 | Smith et al. | 95/140 X |
| 3,785,870 | 1/1974 | Winsel | 429/17 |
| 3,789,106 | 1/1974 | Hay | 95/140 |
| 4,470,829 | 9/1984 | Hirai et al. | 95/140 |
| 4,477,267 | 10/1984 | Reiss | 95/140 X |
| 4,816,353 | 3/1989 | Wertheim et al. | 429/19 |
| 4,861,351 | 8/1989 | Nicholas et al. | 95/140 X |
| 5,096,470 | 3/1992 | Krishnamurthy | 95/140 X |
| 5,489,327 | 2/1996 | Otsuka et al. | 95/140 X |
| 5,604,047 | 2/1997 | Bellows et al. | 429/19 |

OTHER PUBLICATIONS

Handbook of Fuel Cell Technology, Carl Berger, ed., 274–276, Prentice–Hall, 1968 (month N. A.).

Primary Examiner—Stephen Kalafut
Attorney, Agent, or Firm—Paul E. Purwin

[57] ABSTRACT

The present invention comprises a method for lowering the carbon monoxide content of a CO-containing hydrogen-rich gas stream by contacting the gas stream with a scavenger capable of preferentially oxidizing the carbon monoxide in the gas stream and then regenerating the scavenger. The scavenger is selected from the group of mixed oxides of manganese and copper; mixed oxides of manganese and copper in combination with mixed oxides of silver, nickel, iron, and tin; mixed oxides of tin and copper; $SnO_2$—$CuO$ gels; and mixtures thereof. Preferably the scavenger will have a surface area from about 0.5 to about 200 $m^2/gm$.

9 Claims, 1 Drawing Sheet

CARBON MONOXIDE REMOVAL METHOD BASED ON A REGENERABLE CO SCAVENGER

FIELD OF THE INVENTION

The present invention relates to a method for lowering the CO content of a hydrogen rich gas mixture. More particularly the present invention is concerned with lowering the CO content of a hydrogen rich gas mixture to render to the gas mixture more suitable for use in fuel cell systems.

BACKGROUND OF THE INVENTION

Fuel cells are devices that convert the fuel and oxidant to electrical energy. Most efficient fuel cells use pure hydrogen as the fuel and oxygen as the oxidant. Unfortunately use of pure hydrogen has a number of known disadvantages not the least of which is its relatively high cost. Consequently, attempts have been made to operate fuel cells using other than the pure hydrogen as the fuel. For example, attempts have been made to use hydrogen rich gas mixtures obtained from steam reforming methanol as a fuel cell feed. These attempts, however, have not resulted in a practical system because carbon monoxide which is present in such gas mixtures degrades cell performance, even in relatively low concentrations.

It is an object of the present invention therefore to treat a CO-containing, hydrogen rich gas mixture to lower the CO content of the mixture to render it more suitable for use in fuel cell systems.

It is another object of the present invention to provide a method for lowering the CO content of a hydrogen rich gas stream in a single step.

It is another object of the present invention to provide a method for reducing the CO content of a hydrogen rich gas stream which is energy efficient.

Still another object of the present invention is to provide a fuel cell system in which a CO-containing, hydrogen-rich gas stream is subjected to a step in which the CO in the gas stream is oxidized to $CO_2$. In this way, the concentration of CO in the gas stream is lowered to below about 5 ppm in order to provide a substantially CO-free, hydrogen rich gas stream to a fuel cell.

SUMMARY OF INVENTION

Simply stated, the present invention comprises a method for lowering the carbon monoxide content of a CO-containing, hydrogen rich gas stream by contacting the gas stream with a scavenger capable of preferentially oxidizing the carbon monoxide in the gas stream and then regenerating the scavenger, the scavenger being selected from the group consisting of mixed oxides of manganese and copper; mixed oxides of manganese and copper in combination with mixed oxides of silver, nickel, iron and tin; mixed oxides of tin and copper; $SnO_2$—$CuO$ gels; and mixtures thereof. Preferably the scavenger will have a surface area from about 0.5 to about 200 $m^2$/gm.

The present invention also involves a fuel cell system comprising a fuel cell including an anode, a cathode and an electrolyte arranged in operative association with a carbon monoxide separator. The system includes means for bringing a hydrogen rich gas in contact with the carbon monoxide separator to provide a substantially carbon monoxide free, hydrogen rich gas and means to feed the substantially CO free gas to the anode of the fuel cell. The separator contains a scavenger selected from hopcalite and $SnO_2$—$CuO$ gels and others as listed above, and mixtures thereof. The system also includes means for periodically feeding a regeneration gas to the separator to oxidize the scavenger bed that was reduced during use thereby regenerating the scavenger.

These and other embodiments of the present invention will be described in the following detailed description.

DETAILED DESCRIPTION OF THE INVENTION

The present invention has wide applicability in providing substantially CO free, hydrogen rich gas streams; however, the invention is particularly adapted to providing a hydrogen rich gas stream for use in fuel cells. Therefore, the present invention will be described with particular reference to fuel cell systems.

In general, the gas stream used in the present invention will be obtained by the well-known process of steam reforming a hydrocarbon or oxygenate such as methanol and thereafter subjecting the product gas stream to the equally well-known water gas shift reaction. The resultant gas stream typically will contain about 0.5% CO. Alternatively, the gas stream may be obtained by partial oxidation of hydrocarbons, especially methane.

Figure 1:
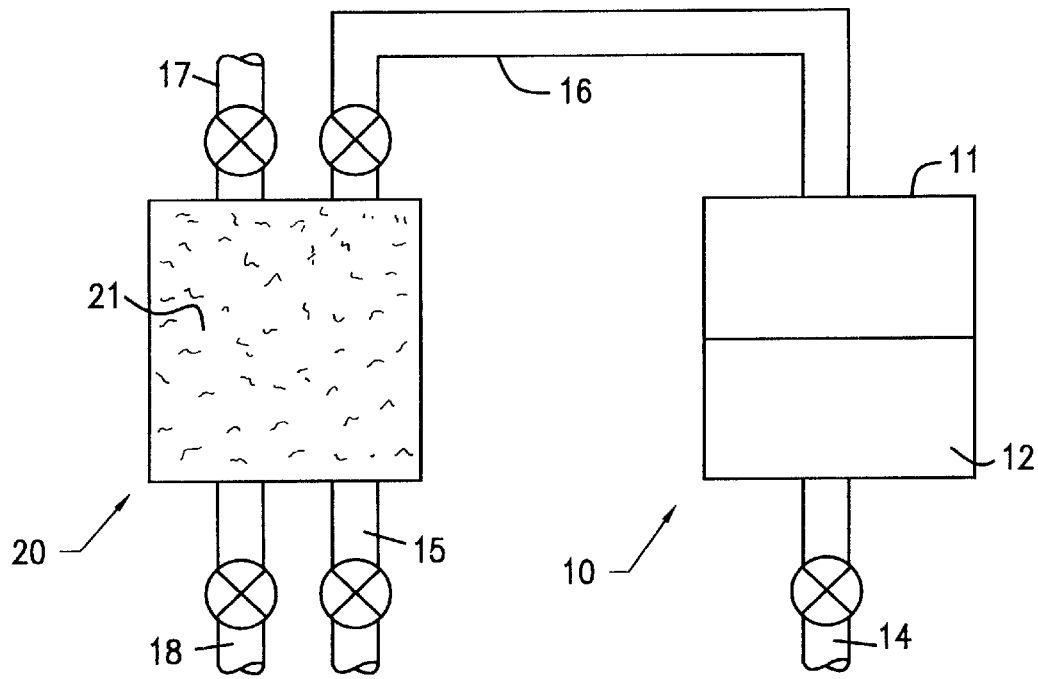
FIG. 1 is a schematic illustration of a fuel cell system including a CO separator utilizing a selective oxidizer in accordance with this invention.

Referring now to FIG. 1, a fuel cell device 10 has been illustrated, for the sake of simplicity, as consisting of a single cell having an anode side or compartment 11 and a cathode side or compartment side 12. A supply line 14 is provided for supplying an oxidant, such as oxygen or air, to the cathode side 12 of the cell. Operably connected to the fuel cell 10 is a carbon monoxide removal apparatus or separator 20. The carbon monoxide removal apparatus 20 is provided with an inlet conduit 15 for introducing a hydrogen rich reformer gas mixture into the apparatus 20.

As shown in the FIG. 1 embodiment, the apparatus 20 contains a bed of solid material 21 capable of selectively oxidizing carbon monoxide in gas mixtures. A conduit 16 is provided in apparatus 20 for removal of substantially CO free, hydrogen rich gas and delivery of the gas to the anode compartment 11 of fuel cell 10. The device 20 also includes a conduit 17 for introducing regeneration gases including steam and air into the separator 20 for restoring the oxidizing capability of scavenger solid 21. Also, a conduit 18 is provided for removal of regeneration products.

In operation, a CO containing, hydrogen rich gas stream, such as that previously described, is introduced via 15 into apparatus 20 for contact with the CO scavenger therein. The purified gas, which is substantially free of carbon monoxide, is removed via line 16 and fed to the anode compartment 11 of fuel cell 10. Prior to the complete utilization of the oxidation capacity of scavenger solid 21, the flow of the purified gas into the apparatus 20 is terminated. The apparatus 20 is then purged with a gentle flow of steam via line 17, and, subsequently an oxygen containing gas such as air is introduced via line 17 into the bed to regenerate solid 21. After the spent scavenger solid 21 is regenerated, the apparatus 20 is again purged with a gentle flow of steam via line 17 and discharged through line 18.

After regeneration of the scavenger solid 21 in separator 20 is complete, flow of sweep gas is terminated and a CO containing gas is again introduced into apparatus 20 via line 15. The CO free gas stream is then fed via line 16 to anode compartment 11. This procedure can be repeated periodically as desired.

Figure 2:
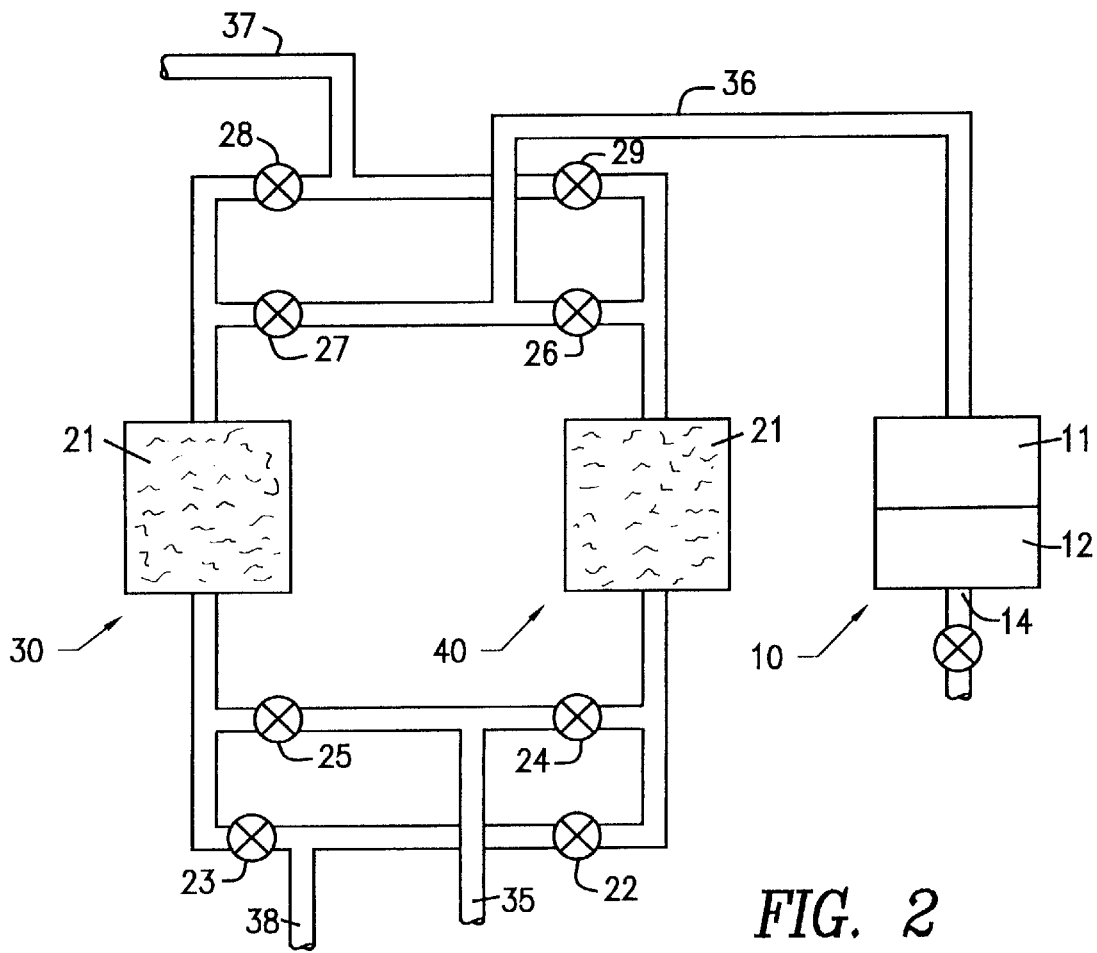
FIG. 2 is a schematic illustration of an alternate embodiment of the invention employing two CO separators in combination with a fuel cell.

In an alternate embodiment of the present invention shown in FIG. 2, two separators 30 and 40 are provided, each containing a scavenger material 21 capable of oxidizing carbon monoxide. The hydrogen rich, carbon monoxide gas to be treated is introduced alternately to separators 30 and 40 via line 35. The treated gas having substantially all of the CO removed is discharged alternately from the adsorbers 30 and 40 via line 36 and is sent to anode compartment 11 of fuel cell 10.

Periodically, the separators 30 and 40 must regenerated. This regeneration is done by introducing an oxygen containing gas such as air via line 37. The gas will flow through adsorbers 30 or 40, as the case may be, and be removed via line 38. The various valves 22 through 29 are operated in appropriate sequence to permit the alternate use of separators 30 and 40. For example, when valves 24 and 26 are open and valves 25, 27, 22, and 29 are closed, the CO containing, hydrogen rich gas introduced via line 35 will flow through the scavenger material 21 in separator 40 and pass via line 36 into the anode compartment 11 of fuel cell 10. Before complete utilization of the oxidation capacity of the scavenger material 21 in separator 40, valves 24 and 26 will be closed and valves 25 and 27 will be opened permitting the flow of reformer gas through the scavenger material 21 in separator 30. At the same time with valves 28 and 23 closed and valves 22 and 29 open, a gentle flow of steam, is introduced via line 37 and will flow through the separator 40 for discharge through line 38 and subsequently the scavenger material 21 is regenerated by a flow of an oxygen containing gas such as air admitted through line 37 and discharged through line 38. After regeneration of the scavenger a gentle flow of steam is again admitted through line 37 and discharged through line 38.

In the practice of the present invention the scavenger 21 is one which is capable of selectively oxidizing CO in a reformer gas stream to provide a hydrogen rich gas stream containing less than about 5 ppm CO and preferably below about 1 ppm and preferably to a stream totally free of CO. Solid scavengers for use in the present invention include mixed oxides of manganese and copper and such mixed oxides in combination with oxides of silver, nickel, iron, chromium, $SnO_2$—CuO gels and tin; and mixtures thereof One example of a suitable scavenger is hopcalite. (U.S. Pat. No. 1,345,323). Solid scavengers from mixed oxides of tin and copper such as $SnO_2$—CuO gels are also suitable for use as scavenger materials. The preferred adsorbents will have a surface area in the range of from about 0.5 to about 200 $m^2/gm$.

The amount of scavenger used (i.e., reduced) will depend of course upon the CO content of the gas stream to be treated, the gas flow rate and the desired length of time to elapse before desorption is required. Typically, the CO containing gas stream will be processed at pressures of from about 0.5 to about 10 atmospheres at temperatures in the range of about 25° C. to about 500° C. Preferred pressure and temperature ranges are 1 to 5 atmospheres and 70° C. to 300° C., respectively.

While the present invention has been illustrated and described as embodied in a particular arrangement of a selective CO scavenger apparatus for use in removal of CO from a gaseous fuel being supplied to a fuel cell, it should be appreciated that the present invention is not limited to this particular example. Rather, the scope of the present invention is to be determined in accordance with the appended claims.

What is claimed is:

1. A method for removing CO from a CO containing, hydrogen rich gas stream to provide a substantially CO free, hydrogen rich gas stream comprising:

passing the CO containing gas stream through a scavenger material capable of selectively oxidizing the CO and selected from the group consisting of mixed oxides of manganese and copper; mixed oxides of manganese and copper in combination with mixed oxides of silver, nickel, iron, chromium, and tin; mixed oxides of tin and copper $SnO_2$—CuO gels; and mixtures thereof, whereby a substantially CO free, hydrogen rich gas stream is obtained.

2. The method of claim 1 wherein the scavenger material has a surface area in the range of from about 0.5 to about 200 $m^2/gm$.

3. A fuel cell system comprising:

a fuel cell having an anode compartment and a cathode compartment;

at least two separators containing a scavenger material capable of selectively oxidizing CO in a CO containing hydrogen gas stream to produce a substantially CO free, hydrogen rich gas stream;

a conduit for feeding a CO containing, hydrogen gas stream to the separator;

a conduit operably connecting the separator to the anode compartment of the fuel cell for delivering the substantially CO free, hydrogen rich gas stream thereto; and a conduit for feeding an oxidant to the cathode compartment.

4. The system of claim 3 including two separators.

5. The system of claim 1 or 4 including a conduit for feeding steam and then an oxygen containing gas to the separator to regenerate the scavenger material.

6. The system of claim 5 wherein the separator contains a scavenger material selected from the group consisting of consisting of mixed oxides of manganese and copper; mixed oxides of manganese and copper in combination with mixed oxides of silver, nickel, iron, chromium, and tin; mixed oxides of tin and copper; $SnO_2$—CuO gels; and mixtures thereof, whereby a substantially CO free, hydrogen rich gas stream is obtained.

7. The system of claim 6 wherein the scavenger has a surface area in the range of from about 0.5 to about 200 $m^2/gm$.

8. The system of claim 8 wherein the scavenger is hopcalite.

9. The system of claim 8 wherein the scavenger is a $SnO_2$—CuO gel.

* * * * *